United States Patent [19]

Beam et al.

[11] Patent Number: 4,768,544
[45] Date of Patent: Sep. 6, 1988

[54] DIGITAL VALVE FLOW CONTROL SYSTEM

[75] Inventors: Benjamin H. Beam, Sunnyvale; Michael W. Cato, Newark, both of Calif.

[73] Assignee: Beam Engineering, Inc., Sunnyvale, Calif.

[21] Appl. No.: 53,963

[22] Filed: May 26, 1987

[51] Int. Cl.$^4$ .................. F16K 11/22; F16K 27/02
[52] U.S. Cl. .................... 137/315; 92/151; 137/599; 251/63.5; 251/367
[58] Field of Search .............. 137/599, 601, 884, 315; 92/151; 251/63, 63.5, 63.6, 367; 91/519

[56] References Cited

U.S. PATENT DOCUMENTS

| | | | |
|---|---|---|---|
| 2,150,077 | 3/1939 | Oehler | 137/599 |
| 2,589,373 | 3/1952 | Hammock | 137/599 |
| 2,627,280 | 2/1953 | Adelson | 137/599 X |
| 3,288,036 | 11/1966 | Fisher | 92/151 X |
| 3,726,296 | 4/1973 | Friedland et al. | 92/599 X |
| 4,205,594 | 6/1980 | Burke | 92/151 X |
| 4,248,263 | 2/1981 | Langill et al. | 137/599 X |
| 4,303,097 | 12/1981 | Zerby | 137/599 |
| 4,356,840 | 11/1982 | Friedland | 137/599 X |
| 4,699,350 | 10/1987 | Herve | 137/315 X |

FOREIGN PATENT DOCUMENTS 2321671 11/1974 Fed. Rep. of Germany ...... 251/367

OTHER PUBLICATIONS

*Final Control Elements*, Chester Beard, pp. 254–255, Rimbach Publications, 1969.

Primary Examiner—Martin P. Schwadron
Assistant Examiner—Stephen M. Hepperle
Attorney, Agent, or Firm—Thomas E. Schatzel

[57] ABSTRACT

A digital valve unit comprised of a plurality of valve orifice sections which have orifice sizes in a binary relationship. The orifice sections are detachable from the valve unit such that the unit may be modified to have different size orifices in different combinations. The unit also comprises a plurality of stackable air powered actuators. The valve actuators may each comprise a single or multiple stage, depending on the application required.

5 Claims, 3 Drawing Sheets

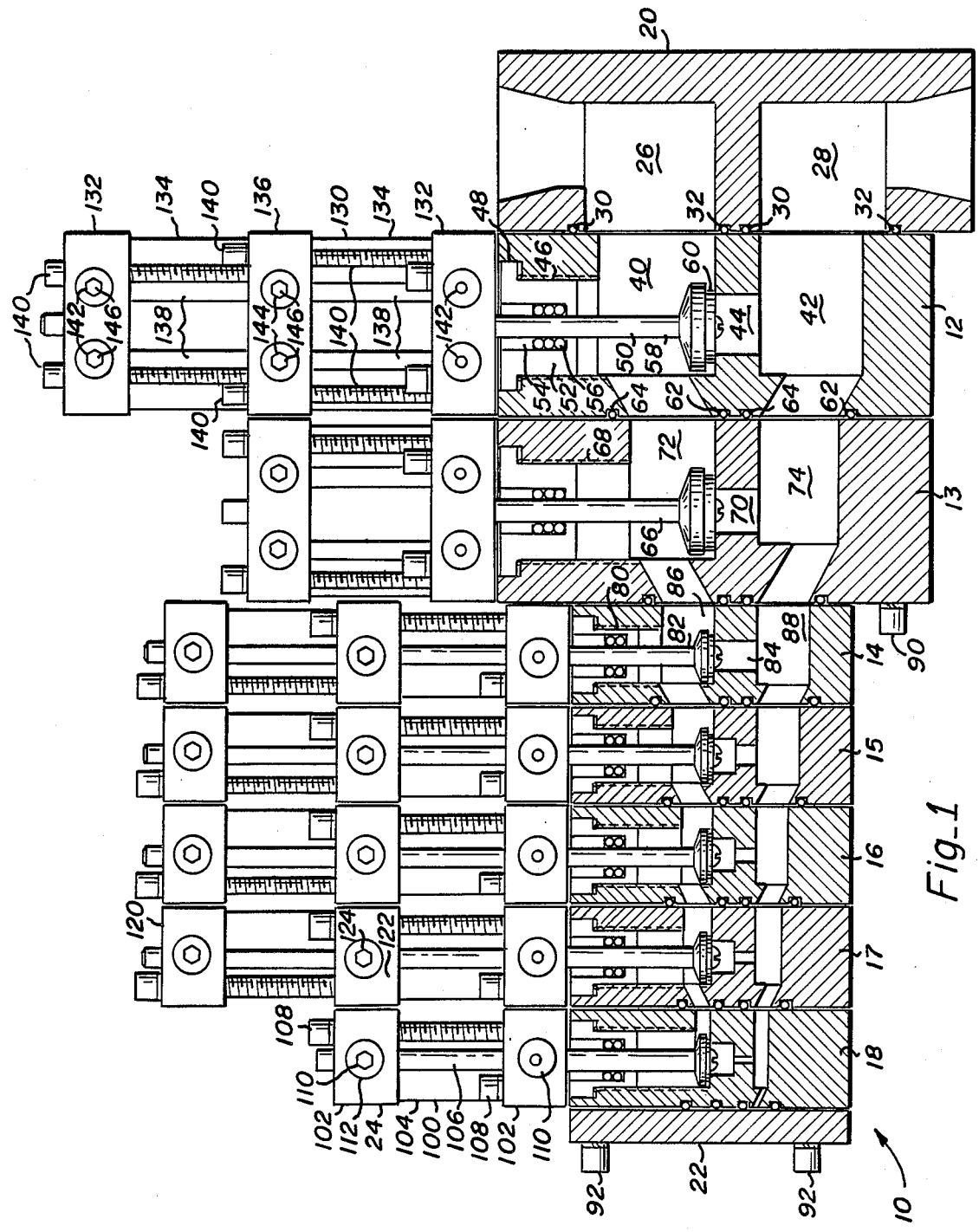
Fig_1

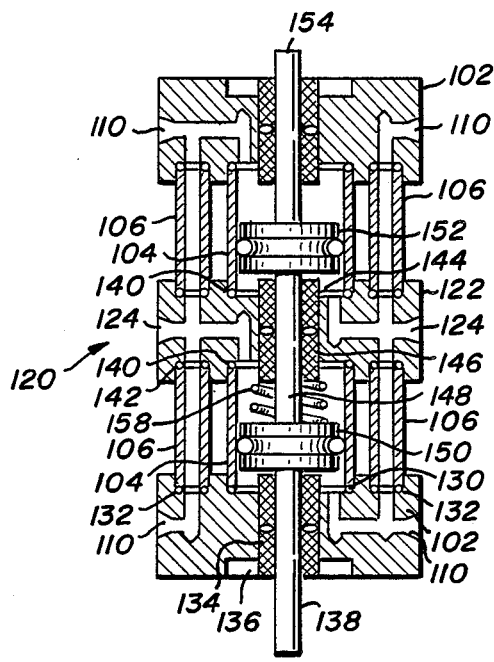
Fig_2
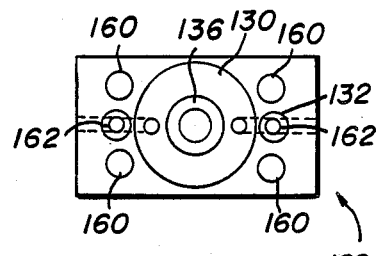
Fig_3
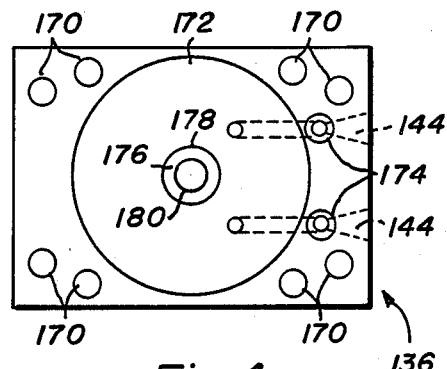
Fig_4
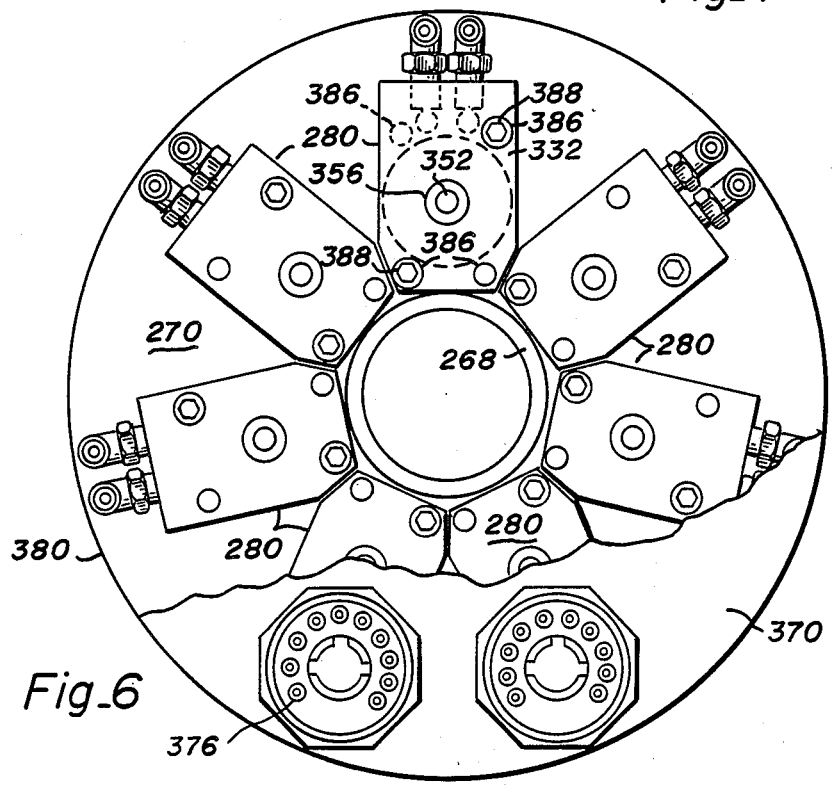
Fig_6

DIGITAL VALVE FLOW CONTROL SYSTEM

BACKGROUND OF THE INVENTION

1. Field of the Invention

The present invention relates generally to digital valves and more specifically to binary digital valves having interchangeable valve sizes and air powered cylinders.

2. Description of the Prior Art

Valves can be divided into two types: analog and digital. Analog valves are by far the most popular and widely used type of valve. Regulation of flow is accomplished by partially closing or opening a valve until the desired flow is achieved. This can be done manually or automatically. Manual control consists of simply turning the valve stem, as with a garden hose nozzle, until the proper volume flow is achieved. Analog valves can be controlled automatically by means of electric, pneumatic, or hydraulic actuators with enough power to position the valve against the fluid head and position sensors which detect the valve position.

Analog valves have several disadvantages. Mechanical clearances and friction in the valve control linkage can introduce hysteresis and uncertaintly in the valve setting. The valve linkage can be sensitive to the fluid forces acting on the valve stem, which can result in disproportionate changes in the fluid flow for changes in the fluid head. Also, the valve response time for analog valves is relatively slow. Changes in the valve setting normally require at least one second, and this applies whether large flow adjustments or small adjustments are desired.

A digital valve consists of a series of valves in parallel with the flow, each valve having a flow coefficient which is a binary multiple of that of the other valves. For example, a digital valve could consist of a group of six solenoid operated valves. The first valve could have a flow coefficient of 1.0, the second valve could have a flow coefficient of 2.0, the third valve could have a flow coefficient of 4.0, the fourth valve would have a flow coefficient of 8.0, the fifth valve would have a flow coefficient of 16.0, and the sixth valve would have a flow coefficient of 32.0. Each of these valves would be operated independently by an electrical signal.

By selecting the proper valve or combination of valves to be opened in the above example, any integral value of flow coefficient between 1.0 and 64.0 can be obtained. An appropriate control system, such as a computer or selector switch, would select a value for the valve opening. If this value is an analog word it would be converted into a digital word in an analog-to-digital converter. Each digit of this word would be directed to its corresponding valve and would direct that particular valve to open or close. Thus, the flow coefficient could be set in digital increments for any desired flow.

Prior art patents which deal with digital valves include: U.S. Pat. No. 4,170,245, by Frank P. Haley; U.S. Pat. No. 4,356,840, by Harry Friedland, et al; U.S. Pat. No. 4,244,396, by Harry Friedland, et al; U.S. Pat. No. 3,942,553, by Robert A. Gallatin; U.S. Pat. No. 3,726,296, by Harry Friedland, et al; U.S. Pat. No. 3,886,971, by Jorgen Lundsgaard, et al; U.S. Pat. No. 4,577,658, by Michael Bosteels, et al; U.S. Pat. No. 4,256,100, by Donald Levy, et al; and U.S. Pat. No. 4,313,465, by Heinz Holzem, et al. Another type of digital valve is disclosed by U.S. Patent Office Defensive Publication No. 692,145, published Dec. 24, 1968, by James Cobb, et al.

One problem with current valves involves operation with high pressure fluids. At higher pressures, more force is needed to lift the valves off of their valve seat. Solenoid powered valves are limited in the amount of force they can exert and are impractical in high pressure fluid applications. Air powered valves are one solution. However, a common source of air pressure, such as shop air sources, usually are no greater than one hundred psi. If a six hundred psi fluid system is being used, then an air diaphragm with an area at least six times the area of the valve would be needed to lift the valve, if air pressure of only one hundred psi is available. In a digital valve system, consisting of several binary valves, the large diaphragms required for each valve would make the entire valve unit very bulky.

Another way to operate a digital valve at high pressures involves using a pilot orifice. In this application, the main valve has a small pilot orifice which can be opened with a solenoid. Once a pilot orifice is opened, a differential pressure exists across the main valve in a direction to open the valve. To close the main valve, the pilot valve is closed, and pressure builds up on top of the main valve and the main valve closes.

Pilot valves have a number of problems. Most depend on positive fluid pressure to work. If there is a negative pressure differential then the main valve will open and remain open even through the control indicates "closed". Another problem involves the pilot orifice. This small passageway must be kept clean, but in certain applications, such as the chemical industry, this pilot orifice can easily become clogged with impurities. This would render the valve inoperable, and would necessitate frequent cleaning of the entire valve assembly.

Another problem with the digital valves of the prior art involves their inflexibility in application. The prior art valve units are built with a certain number of valve orifices, each of which has a certain area. If a different range of flow rates is needed, an entirely different valve with a different number of valve orifices of different sizes may be required.

What is needed is a compact size digital valve unit which can be used in high pressure systems. This valve unit should be constructed such that different numbers of valves and different sizes of valve orifices can be interchanged such that the valve unit can accomodate a variety of applications.

SUMMARY OF THE INVENTION

It is therefore an object of the present invention to provide a compact digital valve for use with high pressure fluids.

It is another object of the present invention to provide a digital valve which can be easily modified for different applications.

It is a further object of the present invention to provide a digital valve with compact stackable air powered piston cylinders.

Briefly, in a preferred embodiment, the present invention comprises a plurality of digital valve chambers. Each valve chamber has an inlet and outlet passage, with an orifice connecting the inlet and outlet passage. Each valve chamber has a valve assembly and a different size orifice.

The orifice sizes are in a binary relationship. The chambers can be bolted together in a series, such that the orifice sizes decrease in a binary progression. The valve unit can accomodate a range of flow rates by substituting different sized valve chambers in different combinations. A cover plate and an inlet and outlet section are bolted to each end of the valve unit.

Stackable, pneumatic cylinders are comprised of an end plate, middle plate, a piston tube and piston assembly. At least one pneumatic cylinder is connected to each valve assembly of each valve chamber of the valve unit. The pneumatic cylinders thus control each valve. Additional pneumatic cylinders may be stacked in series to add more lifting power as desired for high pressure fluid applications. The stacked cylinders provide for a more compact valve unit. Although multi-stage pneumatic cylinders are known in the prior art, they have not been used in connection with digital valves. Also, these prior art cylinders were made in multi-stage units which were not stackable like the cylinders of the present invention.

It is therefore an advantage of the present invention in that it provides a compact digital valve for use with high pressure fluid systems.

It is another advantage of the present invention in that it provides a digital valve unit which can be easily modified for different applications.

It is a further advantage of the present invention in that it provides a digital valve with compact stackable air powered piston cylinders.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a cross sectional view of a digital valve unit of the present invention;

FIG. 2 is a cross sectional view of one of the pneumatic valve actuator cylinders of the present invention;

FIG. 3 is a top view of a small sized actuator plate of the present invention;

FIG. 4 is a top view of a large sized actuator plate of the present invention;

FIG. 6 is a cut-away end view of the digital valve unit of FIG. 5.

DETAILED DESCRIPTION OF THE PREFERRED EMBODIMENTS

Figure 5:
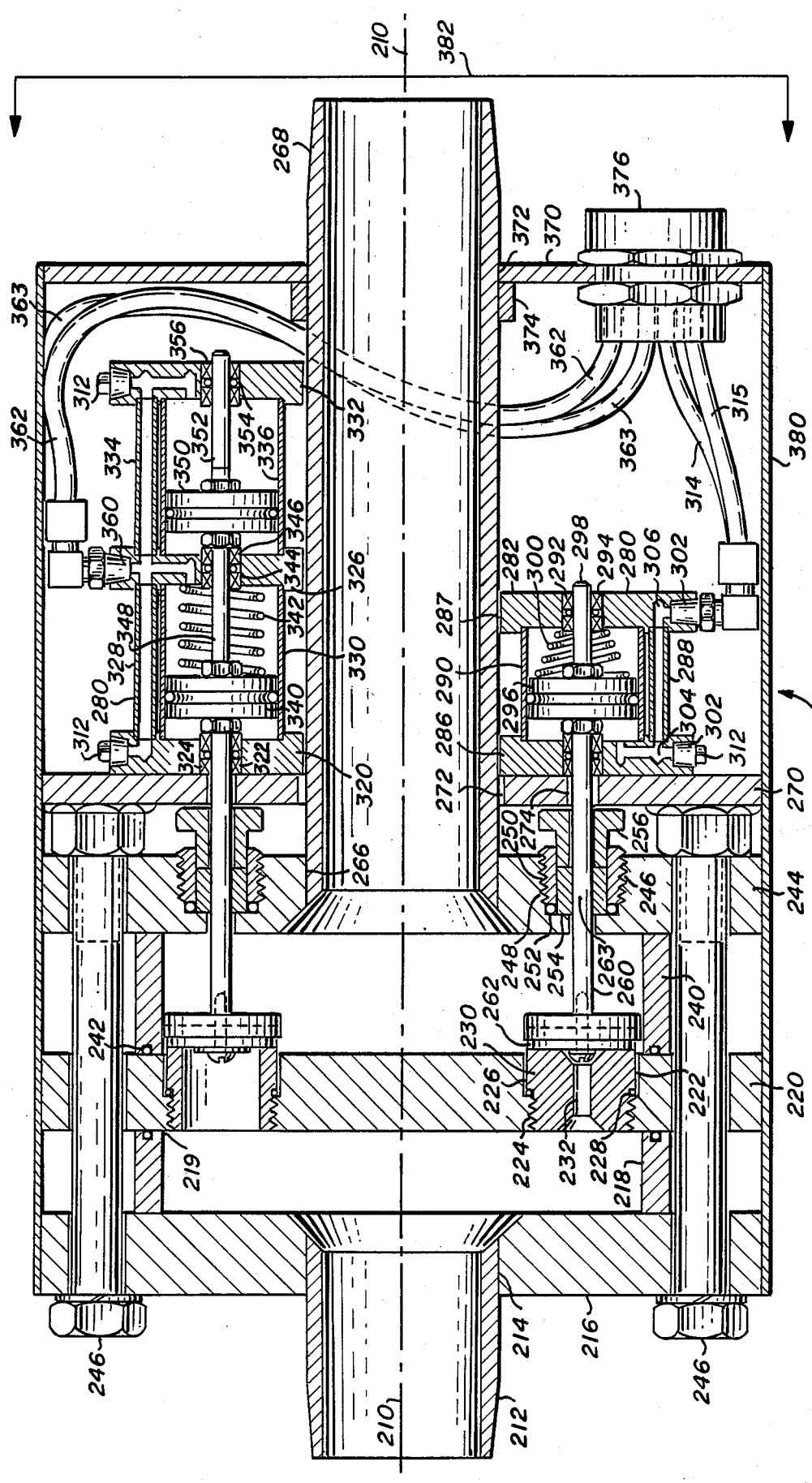
FIG. 5 is a cross sectional view of an alternative embodiment of the digital valve unit of the present invention.

FIG. 1 shows a cross sectional view of the digital valve unit of the present invention and is designated by the general reference number 10. The unit 10 is comprised of a series of valve chambers 12-18, an inlet/outlet section 20, a cover plate 22, and a plurality of valve actuators 24.

Inlet/outlet section 20 is formed from a rectangular piece of steel. The end section 20 has an inlet passage 26 and an outlet passage 28. The inlet passage 26 and outlet passage 28 exit from the section 20 on the same surface, with the inlet passage 26 directly above the outlet passage 28. A pair of channels 30 surround the exits of both inlet passage 26 and outlet passage 28. A pair of O-ring seals 32 fit inside channels 30.

Valve chambers 12 and 13 are both constructed of rectangular steel blocks of similar size and have similar parts. Valve chambers 12 and 13 are known as large sized valve chambers. Chamber 12 has an inlet passage 40 which connects with inlet passage 26 of section 20. An outlet passage 42 connects with outlet passage 28 of section 20. A valve orifice 44 connects inlet passage 40 and outlet passage 42. A valve assembly aperture 46 intersects perpendicularly with inlet passgage 40, directly above orifice 44. The aperture 46 has a countersunk section 48. The aperture 46 receives a valve assembly 50. Valve assembly 50 comprises a plug 52, a packing nut 54, a valve packing seal 56, a valve 58 and a valve seal 60. Valve seal 60 seats around orifice 44. A pair of channels 62 surround inlet and outlet passages 40 and 42 where they exit on the surface opposite from section 20. O-ring seals 64 fit inside channel 62 to provide a seal with valve chamber 13. Other valve chambers 13-18 have similar channels and O-rings to provide seals for their inlet and outlet passages.

Valve chamber 13 is similar to chamber 12. A valve assembly 66, of the same size as valve assembly 50, is positioned inside a valve aperture 68. A valve orifice 70 connects an inlet passage 72 and an outlet passage 74. Orifice 70 is one half the area of orifice 44. Similarly, the inlet passage 72 and outlet passage 74 are proportionately smaller than the inlet passage 40 and outlet passage 42 of valve chamber 12.

Valve chambers 14-18 are all constructed of rectangular steel blocks which are smaller in size than valve chambers 12 and 13. Valve chambers 14-18 are known as small sized valve chambers. Chamber 14 has a valve aperture 80 with a valve assembly 82. Valve assembly 82 is similar to assembly 50, except that assembly 82 is of a smaller size. An orifice 84 is one-half the area of orifice 70 and the inlet and outlet passages 86 and 88 are also proportionately smaller than their counterparts in chamber 13. Chambers 15-18 also have valve assemblies similar to assembly 82. Each of chambers 15-18 also has an orifice which connects an inlet and outlet passage. Each of the orifices in chambers 15-18 has an area which is one-half the size of the orifice of the preceding chamber.

Chambers 12 and 13 and section 20 are attached together by means of four bolts 90, only one of which is shown in FIG. 1. Cover plate 22 and chambers 14-18 are secured to chamber 13 by four bolts 92, only two of which are shown in FIG. 1. Additional chambers with even smaller orifices could be added between cover plate 22 and chamber 18. Alternatively, a number of the smaller chambers could be deleted. Thus, unit 10 can be configured in different binary combinations depending on the application required.

The valves of unit 10 are operated by means of pneumatic piston cylinders 24, otherwise known as valve actuators. These actuators can be stacked to increase the lifting force as needed. There is a small size actuator 100 which is sized to fit over one of the small chambers 14-18. The actuator 100 comprises a pair of end plates 102, a piston cylinder tube 104, and a pair of air tubes 106, only one of which is shown. The actuator 100 is held together and secured to the top of chamber 18 by bolts 108. The end plates 102 each have a pair of air intake apertures 110, only one of which is shown. The top end plate 102 has a plug 112 in its aperture 110. Actuator 100 has only one piston cylinder tube 104, and would thus be known as a single stage actuator.

A double stage actuator 120 is attached over chamber 17. Actuator 120 is also of the small type in order to fit over one of the small chambers, such as chamber 17. The actuator 120 comprises the same parts as actuator 100, but in addition, includes a middle connector plate 122. The middle plate 122 has a couple of air apertures 124, only one of which is shown. Additional actuator stages may be added by adding additional middle connector plates 122, piston cylinder tubes 104, and air tubes 106. Thus, an actuator having three stages or more is possible.

A double stage actuator 130 is shown above chamber 12. Actuator 130 is of the larger size type, and is sized to fit over the larger chambers such as chambers 12 and 13. The actuator 130 has a pair of end plates 132, a pair of piston cylinders 134, a middle plate 136 and four air tubes 138. The actuator 130 is held together by a plurality of bolts 140. Plate 132 has a couple of air apertures 142. Middle plate 136 has a couple of air apertures 144. The air apertures 144 of the top plate 132 and the air apertures 144 of middle plate 136 are plugged with plugs 146.

FIG. 2 shows a cross sectional view of the double stage actuator 120 of FIG. 1. The end plates 110 have countersunk portions 130 on both sides into which the piston tubes 104 sit. The end plates 110 also have a pair of countersunk portions 132 into which the air tubes 106 sit. Plate 110 has an aperture 134 which receives an oil-less bearing 136 and a valve 138 from chamber 17.

Middle plate 122 has a pair of countersunk portions 140 which receive piston tubes 104 on each side. A pair of countersunk portions 142 are located on each side of plate 122 to receive air tubes 106. Middle plate 122 has an aperture 144 which receives an oil-less bearing 146 and a connecting rod 148. A piston 150 is connected between rod 148 and valve 138. Connecting rod 148 is connected to a second piston 152 and a second connecting rod 154. The number of stages could be increased by substituting another middle plate 122 for top end plate 102 and then adding another piston tube, a pair of air tubes, another piston, another connecting rod, and an end plate on top. Seals such as O-rings are used where tubes 104 and 106 meet plates 110 and 122.

The end plate 110 and middle plate 122 have passages such that the apertures 110 and 124 on the left side are connected together through tubes 106 and are in turn connected to the top side of pistons 150 and 152. There are also passages such that the apertures 110 and 124 on the right side are connected together through tubes 106 and are in turn connected to the bottom side of pistons 150 and 152. In operation, only one aperture 110 or 124 is left open on each side, the rest are plugged with plugs 112. The open apertures on either side are connected to a solenoid and electrical control which regulates the flow of air to the actuators. By feeding air into one side or the other, pistons 150 and 152 can be controlled to go up or down and open or close the valve 138.

By using solenoid controls for the actuators, fast operation of the valves in the valve unit 10 is achieved. A direct acting solenoid valve can open or close in about twenty miliseconds. The opening or closing time for the pneumatic actuators depends on the difference between the fluid force and the pneumatic force acting on the plunger, but has been measured on a test stand at about two hundred miliseconds. Thus, an expected time of about two hundred and two hundred fifty miliseconds is expected for opening or closing each valve. Because the actuators are double acting (air can be exerted on both sides of the pistons), the valves in the valve unit are able to be closed as rapidly as they are opened. There is no need to depend on fluid pressure to close the valve. The double action of the actuator also acts to form a tight seal against back pressure in the line.

A spring 158 is connected behind piston 150 and acts to keep the valve 138 seated in the absence of control air pressure. Placing the spring on the other side of the piston 150 would similarly act to keep the valve open in the absence of air pressure.

FIG. 3 shows a top view of one of the middle plates 122. The plate 122 has four threaded bolt apertures 160 for receiving bolts 108. Two bolts 108 at diagonally opposite corners are used to hold each plate 122 to the next plate. End plates 122 have a similar arrangement of bolt holes. The next plate either 102 or 122 would then have bolts using the alternate holes. The bolts would alternate such that a stacking arrangement can be achieved. Middle plate 122 has a plurality of passages 162 each connected to one of air apertures 124. End plate 102 is similar to middle plate 122 except for the arrangement of passages 162.

FIG. 4 shows a top view of middle plate 136 for a large sized double actuator such as 130 of FIG. 1. The plate 136 has a countersunk portion 172 on both sides for receiving piston tube 134. Plate 136 also has a pair of countersunk portions 174 on both sides for receiving air tubes 138. An aperture 176 is sized to receive a bearing 178 and a connecting rod 180. The actuator 130 would be constructed similar to actuator 120 of FIG. 2, except that the air tubes 138 are on the same side. Also, four bolts 140 are used at each corner to secure the plate 136 to the next plate. The bolts would alternate between using the outer four holes and the inner four holes such that a stacking arrangement is achieved.

FIG. 5 shows an alternative embodiment of the present invention digital valve unit and is designated by the general reference number 200. The valve unit 200 is cylindrical in shape as compared with the rectangular valve 10 of FIG. 1.

The valve 200 has a central axis 210. An outlet pipe 212 is received by an aperture 214 of a circular collector plate 216 and is welded in place. A spacer ring 218 is welded to collector plate 216. Both the collector plate 216 and spacer ring 218 are centered along axis 210.

A circular valve orifice plate 220 abuts the spacer plate 218. An O-ring seal 219 seals plate 222 to ring 218. The orifice plate 220 has a plurality of plug apertures 222 in a circular pattern about axis 210. In a preferred embodiment, there are seven apertures 222. Each aperture 222 has a threaded section 224 and a countersunk portion 226 for receiving an O-ring seal 228. An orifice plug 230 is screwed into each aperture 222. Each of the seven plugs 230 has a different size orifice 232 running through its length. The area sizes of the orifices 232 are in a binary relationship.

A spacer ring 240 abuts orifice plate 220. An O-ring seal 242 seals plate 222 to ring 240. A circular packing plate 244 is welded to spacer ring 240. Plates 220 and 244 and spacer ring 240 are centered about axis 210. Plates 216, 220 and 244 are all bolted together by a plurality of bolt assemblies 246 which are arranged in an evenly spaced circular pattern about axis 210. Eight bolt assemblies are used in the preferred embodiment.

The packing plate 244 has a plurality of valve assembly apertures 246. There are seven apertures 246 in the preferred embodiment, and each one is located directly behind one of the plug apertures 222 of orifice plate 220. Each valve assembly aperture 246 has a countersunk threaded portion 248 which receives a nut 250 and an O-ring seal 252. A packing seal 254 and a plug 256 fit inside nut 250. Each aperture 246 receives a valve 260 which passes through seal 254 and plug 256. Each valve 260 has a valve seat 262 which seats over orifice 232. Nut 250, O-ring 252, seal 254, plug 256, valve 260, and valve seal 262 all comprise a valve assembly 263.

The packing plate 244 has a central aperture 266 which receives an inlet pipe 268. Inlet pipe 268 is welded to the inside of aperture 266. Aperture 266 and inlet pipe 268 are centrally located along axis 210.

A circular actuator plate 270 has an aperture 272 which is sized to receive inlet pipe 268. Plate 270 is welded to bolt assemblies 246 behind packing plate 244. Aperture 272 and plate 270 are centered along axis 210. Plate 270 has a plurality of valve apertures 274 which each receives one of valves 260. In the preferred embodiment, there are seven apertures 274 each located directly behind one of the apertures 246 of plate 244.

Directly behind each aperture 274 is a stackable valve actuator 280. In FIG. 5, both a single stage actuator 282 and a double stage actuator 284 are shown. Actuators 280 are similar in construction to the actuator 120 of FIG. 2.

The single stage actuator 282 is comprised of a couple of end plates 286 and 287 which hold a couple of air tubes 288 and a piston 290 between them. End plates 286 and 287 are exactly alike. Bolts, not shown, hold plate 286 to plate 270 and hold plate 287 to plate 286. Seals, such as O-rings, are used between tubes 288 and 290 and plates 286 and 287. End plates 286 and 287 each have an aperture 292 located directly behind aperture 274 of plate 270. Each aperture 292 receives a packing assembly 294. One of valves 260 is received through aperture 292 and packing assembly 294 of plate 286. A piston 296 is connected to valve 260 and slides inside piston tube 290. A connector rod 298 is connected to the other side of piston 296 and passes through aperture 292 and packing assembly 294 of the second end plate 287. A spring 300 is connected in back of piston 296 and acts to keep the valve 260 seated in the absence of air pressure.

Each of end plates 286 and 287 has a pair of inlets 302 of which only one is shown. A first inlet 302 connects a passage 304 to a first air tube 288 and the inside of tube 290. The first air tube 288 connects passage 304 with a passage 306 of end plate 287. Plate 287 also has a pair of air inlets 302, one of which is connected to passage 306. Since plate 286 and 287 are really the same plate, just in reverse position, plate 286 also has a passage similar to passage 306 of plate 287, and plate 287 has a passage similar to passage 304 of plate 286.

The pair of air inlets 302 on one of the plates, plate 286 in this case, is sealed with a couple of plugs 312. A pair of air tubes 314 and 315 is then connected to the air inlet 302 of plate 287. Thus, when air is sent through tube 315 it enters passage 306, goes through tube 288 and passage 304 and enters into piston tube 290 on the side of piston 296 next to plate 286. When air is sent through tube 314 the air would exit plate 287 into piston 290 on the side of piston 290 nearest plate 287.

The double stage actuator 244 is similar in construction to the single stage actuator 282. An end plate 320 abuts plate 270. End plate 320 has an aperture 322, containing packing 324 which receives one of valves 260. A middle plate 326 holds a pair of air tubes 328 and a piston tube 330 against end plate 320. A second end plate 332 holds a pair of air tubes 334 and a piston tube 336 against middle plate 326. Bolts, not shown, are used to secure plate 332, plate 326, plate 320 and plate 270 together. O-ring seals are used to seal tubes 328, 330, 334 and 336 to plates 320, 326 and 332.

A piston 340 is connected to one of valves 260 inside of piston tube 330. A spring 342 is mounted behind piston 340 to keep valve 260 seated even in the absence of air pressure. Middle plate 326 has an aperture 344 which contains a packing 346 which receives a connecting rod 348. A second piston 350 is connected to rod 348 inside piston tube 336 and is in turn connected to a connecting rod 352. End plate 332 has an aperture 354 which contains a packing 356 and receives rod 352.

End plates 286, 287, 320 and 332 are all the same. End plates 320 and 332 thus have air inlets and passages similar to plates 286 and 287. Middle plate 326 also has a couple of air inlets 360. A couple of air tubes 362 and 363 connect to air inlets 360. As shown, air entering through tube 362 would discharge behind pistons 340 and 350. Air entering through tube 363 would pass through a passage, not shown, in middle plate 326 and be discharged in front of pistons 350 and 340. Note that tubes 362 and 363 are connected to inlet 360 of middle plate 326, so the inlets of end plates 320 and 332 are plugged with plugs 312.

A circular cover plate 370 contains an aperture 372. A ring 374 is welded to plate 370. Both ring 374 and aperture 372 are centered along axis 210 and are sized to receive inlet pipe 268. Plate 370 also contains a plurality of air tube connectors 376. Tube connectors 376 provide for quick and easy connection to a control box, not shown, which contains the air line solenoids and electrical controls. A cylindrical cover 380 is sized to slip over plates 216, 220, 244, 270 and 370.

FIG. 6 shows an end view of the inlet side of valve 200 taken along line 382 of FIG. 5 with cover 370 shown cut-away. The actuators 280 are arranged in a circular pattern symmetrical about inlet pipe 268. End plate 332 is the same as all other end plates shown. End plate 332 has four bolt apertures 386, one at each corner. Note that only two apertures at diagonal corners contain bolt assemblies 388. This is to allow for a stacking arrangement of multiple stages. The bolts shown hold plate 332 to middle plate 326. Another set of alternate bolts would be placed in alternate diagonal corners such that middle plate 326 would be secured to plate 320. Another alternate set of bolts would secure plate 320 to plate 270. In this way, a number of actuator stages can be stacked.

The operation of valve 200 is similar to valve 10. The orifices 232 have area sizes which are in binary progression. Since there are seven orifices, it is possible to divide the flow of fluid entering inlet pipe 268 into $2^7$ (or 128) increments. The exact flow is determined by opening or closing a combination of the seven valves 260.

The valves 260 are controlled by a control box which contains solenoids and electrical controls. The control box would select the appropriate air tubes into which the air would be directed such that the pistons of the actuators and in turn, the valves, are moved up or down. Due to the construction of the actuators, it is easy to stack multiple actuator stages together in order to obtain the necessary lifting force when high pressure fluids are used in valve 200. Note also that the orifice plugs 230 can be easily screwed into or out of apertures 222 of plate 220. By having a variety of plugs 230 with different orifice sizes, it is easy to modify valve 200 to handle different ranges of flow rates. As with valve 10, valve 200 presents a compact digital valve which can be easily adapted to different configurations.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A digital valve comprising:
   an orifice having a plurality of plug apertures;
   a plurality of plugs having different sized orifices and sized to sealingly fit inside said plug apertures;
   a spacer member sealingly attached to the orifice plate and surrounding said plug apertures;
   a valve assembly plate sealingly attached to the spacer member and having an inlet aperture and a plurality of valve assembly apertures, each valve assembly aperture located directly behind one of said plug apertures;
   a plurality of valve assemblies with each located in a respective one of said valve assembly apertures; and
   a plurality of pneumatic piston cylinder series units one of which is connected to each said valve assemblies, the series units being sized to mount behind each of said valve assemblies, each series unit comprised of a pair of end plates, at least one middle plate, a plurality of piston tubes, a plurality of air tubes, a plurality of pistons, and a plurality of connecting rods, each end plate having a first air inlet connected to a passage which connects with a first one of said air tubes, and a second air inlet connected to a passage which connects to a second one of said air tubes and the inside of said piston tube, and each middle plate having a first air inlet connected to a passage which connects with a first pair of air tubes and one of said piston tubes on a first side of said middle plate, and a second air inlet connected to a passage connected with a second pair of air tubes and one of said piston tubes on a second side of said middle plate.

2. A digital valve comprising:
   a circular collector plate having an outlet aperture;
   a cylindrical spacer member sealingly attached to the collector plate;
   a circular orifice plate, having a plurality of plug apertures arranged in a circular pattern around the orifice plate, the orifice plate sealingly being attached to the cylindrical spacer member;
   a plurality of plugs having different sized orifices and sized to sealingly fit inside said plug apertures;
   a second cylindrical spacer member sealingly attached to the orifice plate;
   a circular valve assembly plate sealingly attached to the second spacer member having a plurality of valve assembly apertures, each valve assembly aperture located directly behind one of said plug apertures and having an inlet aperture;
   a plurality of valve assemblies with each located in a respective one of said valve assembly apertures; and a plurality of pneumatic piston cylinder series units, one of which is connected to each of said valve assemblies, the series units being sized to mount behind each valve assembly, each series unit comprised of a pair of end plates, at least one middle plate, a plurality of piston tubes, a plurality of air tubes, a plurality of pistons and a plurality of connecting rods, each end plate having a first air inlet connected to a passage which connects with a first one of said air tubes, and a second air inlet connected to a passage which connects to a second one of said air tubes and the inside of said piston tube, and each middle plate having a first air inlet connected to a passage which connects with a first pair of air tubes and one of said piston tubes on a first side of said middle plate, and a second air inlet connected to a passage connected with a second set of air tubes and one of said piston tubes on a second side of said middle plate.

3. A digital valve comprising:
   an orifice plate having a plurality of threaded plug apertures, said plug apertures each having a countersunk portion containing a seal;
   a plurality of threaded plugs having different sized orifices and sized to fit inside said plug apertures and abut said seals;
   a spacer member sealingly attached to the orifice plate and surrounding said plug apertures;
   a valve assembly plate sealingly attached to the spacer member and having an inlet aperture and a plurality of valve assembly apertures, each valve assembly aperture located directly behind one of said plug apertures;
   a plurality of valve assemblies with each located in a respective one of said valve assembly apertures; and
   a plurality of pneumatic piston cylinder series units, one of which is connected to each of said valve assemblies, the series units are sized to mount behind each of said valve assemblies, each series unit comprised of a pair of end plates, at least one middle plate located between said end plates, a piston tube and a pair of air tubes located between each of said middle and end plates, said piston tubes each containing a piston and a connecting rod, said middle and said end plates connected by bolt assemblies.

4. The unit of claim 3 wherein,
   each of said end plates and each of said middle plates includes two sets of bolt assembly holes in alternate patterns, such that each individual piston tube in said series units has its own bolt assemblies and a piston tube may be added or removed from said series units without disturbing the piston tubes that remain.

5. A digital valve comprising:
   a circular collector plate having an outlet aperture;
   a cylindrical spacer member sealingly attached to the collector plate;
   a circular orifice plate, having a plurality of threaded plug apertures arranged in a circular pattern around the orifice plate, said plug apertures each having a countersunk portion containing a seal, the orifice plate sealingly attached to the cylindrical spacer member;
   a plurality of threaded plugs having different sized orifices and sized to fit inside said plug apertures and abut said seals;
   a second cylindrical spacer member sealingly attached to the orifice plate;
   a circular valve assembly plate sealingly attached to the second spacer member having a plurality of valve assembly apertures, each valve assembly aperture located directly behind one of said plug apertures, and having an inlet aperture;

a plurality of valve assemblies located in each one of said valve assembly apertures; and a plurality of pneumatic piston cylinder series units, one of which is connected to each of said valve assemblies, the series units are sized to mount behind each of said valve assemblies, each series unit comprised of a pair of end plates, at least one middle plate located between said end plates, a piston tube and a pair of air tubes located between each of said middle plates and end plates, said piston tubes each containing a piston and a connecting rod, said middle and said end plates connected by bolt assemblies, each of said end plates and each of said middle plates include two sets of bolt assembly holes in alternate patterns, such that each individual piston tube in said series unit has its own bolt assemblies and a piston tube may be added or removed from said series units without disturbing the piston tubes that remain.

* * * * *